United States Patent Office 2,763,030
Patented Sept. 18, 1956

2,763,030
METHOD OF PRECIPITATING AND FORMING HYDROXY ALKYL CELLULOSE INTO FILMS

Donald Robert Erickson, Kalamazoo, Mich.

No Drawing. Application May 7, 1953,
Serial No. 353,660

2 Claims. (Cl. 18—57)

This invention relates to methods of precipitating hydroxy alkyl cellulose and particularly hydroxyethyl cellulose and of forming it into films either consisting of the hydroxy alkyl cellulose alone or pigmented or on a suitable paper base either with or without filler therein, such as is used in producing pigmented coated papers for printing.

Hydroxyethyl cellulose is produced from cellulose by the etherification of hydroxyl groups in the cellulose molecule by means of ethylene oxide or ethylene chlorhydrin. When one hydroxyl group in every three or four or five glucose units of the cellulose polymer is so etherified, a product is produced that is insoluble in water and is substantially soluble only in aqueous sodium hydroxide solutions with a sodium hydroxide content of from 4% to 10%. This product is not only water-insoluble, but is substantially insoluble in other hydroxides than sodium and in other sodium compounds than the hydroxide. It is precipitated from the solution by eliminating the sodium hydroxide or by changing it to a sodium salt.

In my United States Patents Nos. 2,502,782 and 2,502,783 I describe methods of forming films of hydroxy alkyl cellulose and particularly hydroxyethyl cellulose. In forming films such as are described there, or clear films for use in packaging or the like, it has been the practice to employ water-insoluble hydroxy alkyl cellulose such as hydroxyethyl cellulose or hydroxy methyl cellulose. These are dissoved in an aqueous solution of sodium hydroxide. The solution is made of the desired viscosity so that it can form a film or serve as an adhesive in coating a suitable paper base, either clear or pigmented. Thereafter the film of solution is formed and the insoluble hydroxy alkyl cellulose is precipitated by means of water-soluble acids, alkali metal acid salts and ammonium salts.

In carrying out the aforesaid process, it is generally necessary to precipitate the film of hydroxy alkyl cellulose to immerse the film of sodiumhydroxide solution of the hydroxy alkyl cellulose in a water solution of the acids or salts employed. This involves a wet process with tanks and immersion equipment and entails the expense of supplying the necessary acids or salts, which are used up in the process. It may also be necessary to employ extra drying procedures because of the immersion in water. Furthermore, when ammonium salts are employed, ammonia may be released into the plant.

The present invention eliminates the aforesaid undesirable features of the above-described process. The precipitation of the hydroxyethyl cellulose is brought about with carbon dioxide gas. The carbon dioxide reacts with the sodium hydroxide, which keeps the hydroxy alkyl cellulose in solution forming sodium carbonate. The hydroxyethyl cellulose is thus precipitated in the form of a film corresponding to the film formed of the sodium hydroxide solution thereof.

The use of carbon dioxide is particularly desirable because carbon dioxide is available in large quantities in flue gases in practically all manufacturing plants. Even in plants where flue gases are not available, carbon dioxide is available from the gas-fired heaters or dryers which are used in connection with the drying of the finished product. It is not necessary to have special metallic tanks, pumps, pipes, or containers for holding aqueous acids, salts or ammonium salts, and no special applicators are necessary to apply the gas, which can be applied by merely exposing the film to the gas.

The gas should be at a temperature of about 85° C., although satisfactory results can be obtained at temperatures as low as 70° C. In cases where there are exceptionally long flights of film-carrying equipment available, the temperature may be reduced even lower than 70° C., although for most practical operations anything below 70 C. is too slow for the precipitation.

As an example of carrying out the method, a viscous solution of hydroxyethyl cellulose capable of forming film is prepared. A solution containing about 8% solid hydroxyethyl cellulose is preferred. It is dissolved in aqueous sodium hydroxide containing 4% to 10% by weight of sodium hydroxide. The film which is cast may be, for example, about 0.0125 inch in thickness to give a dry film of 0.001. After the wet film has been formed by any conventional film-forming means, it is carried through a gas chamber, where it is exposed to carbon dioxide gas. At a temperature of 85° C. complete precipitation is accomplished in about twenty seconds.

The same procedure may be employed in connection with the coating of a suitable paper base. A coating either pigmented or unpigmented, as described in my patents No. 2,502,782 and No. 2,502,783 aforesaid, may be applied to the paper base by conventional means. Thereafter the base bearing the coating is passed through the gas chamber where it is subjected to the carbon dioxide gas at a temperature of 85° C.

As pointed out above, this temperature may be reduced to 70° C. with highly satisfactory results. Much higher temperatures can be employed, the only upper limit being that the temperature should not be so high as to dry the film to such an extent that it sticks to the belt on which it is cast. However, gases may be employed as hot as about 150° C., although generally a lower temperature is more satisfactory. If such high temperatures are used, the film should be left in the gas chamber for only a short period of time.

The carbon dioxide may come directly from flue gases or from heaters used in later drying steps.

After the coating has been applied, the film or paper bearing the film may be dried or washed and dried in any conventional manner, although in general very little drying will be necessary as compared with the aforesaid processes in which the film is subjected to a bath of acid or salt.

The aforesaid examples of the invention have been given as illustrative only. It will be understood that they are not given by way of limitation, but are only to illustrate typical examples of the invention, which is not limited to these specific forms.

I claim:

1. The method of forming water-insoluble films comprising hydroxyethyl cellulose comprising forming a film comprising a viscous solution of water-insoluble hydroxyethyl cellulose in aqueous sodium hydroxide and precipitating the hydroxyethyl cellulose from solution by contacting the film with carbon dioxide gas at a temperature above 70° C. whereby to react the sodium hydroxide and carbon dioxide.

2. The method of forming water-insoluble films comprising hydroxy alkyl cellulose comprising forming a film comprising a viscous solution of water-insoluble hydroxy alkyl cellulose in aqueous sodium hydroxide and precipitating the hydroxy alkyl cellulose from solution by contacting the film with carbon dioxide gas at a temperature above 70° C. whereby to react the sodium hydroxide and carbon dioxide.

References Cited in the file of this patent
UNITED STATES PATENTS 2,447,757    Lilienfeld _____ Aug. 24, 1948